(12) United States Patent
Foxenland

(10) Patent No.: US 7,263,380 B2
(45) Date of Patent: Aug. 28, 2007

(54) METHOD AND DEVICE FOR SCROLLING SPEED CONTROL

(75) Inventor: Eral Foxenland, Helsingborg (SE)

(73) Assignee: Sony Ericsson Mobile Communications AB (SE)

( * ) Notice: Subject to any disclaimer, the term of this patent is extended or adjusted under 35 U.S.C. 154(b) by 3 days.

(21) Appl. No.: 10/553,369

(22) PCT Filed: Apr. 20, 2004

(86) PCT No.: PCT/EP2004/004168

§ 371 (c)(1),
(2), (4) Date: Oct. 17, 2005

(87) PCT Pub. No.: WO2004/097616

PCT Pub. Date: Nov. 11, 2004

(65) Prior Publication Data

US 2006/0246940 A1 Nov. 2, 2006

Related U.S. Application Data

(60) Provisional application No. 60/467,963, filed on May 5, 2003.

(30) Foreign Application Priority Data

Apr. 28, 2003 (EP) ................. 03009504

(51) Int. Cl.
*H04M 1/00* (2006.01)
(52) U.S. Cl. ............... 455/550.1; 455/425; 455/556.1; 455/90.1; 345/684; 345/166
(58) Field of Classification Search ........... 455/550.1, 455/425; 345/684, 166, 687; 382/313
See application file for complete search history.

(56) References Cited

U.S. PATENT DOCUMENTS 6,334,003 B1 * 12/2001 Yokota ................ 382/313

(Continued)

FOREIGN PATENT DOCUMENTS

EP 0474234 A2 3/1992

(Continued)

OTHER PUBLICATIONS

International Search Report corresponding to European Application No. PCT/EP04/004168 mailed Jul. 9, 2004.

*Primary Examiner*—Jean Gelin
*Assistant Examiner*—David Q. Nguyen
(74) *Attorney, Agent, or Firm*—Myers Bigel Sibley & Sajovec, PA

(57) ABSTRACT

The present invention is directed towards a method and a device for varying the scrolling speed provided for a set of items. The device comprises a first user input unit for allowing a scrolling action selection by the user, a second user input unit for allowing a scrolling speed variation selection, and a control unit, which provides a set of items of information that can be scrolled by a user (step 32), detects a scrolling action selection by a user via the first user input unit (step 34), detects a scrolling speed variation selection via the second user input unit (step 38), and changes the scrolling speed in dependence of the selections made by the user, (steps 42, 44). In this way varied scrolling speeds that can be fully controlled by a user in a simple manner are provided.

23 Claims, 2 Drawing Sheets

U.S. PATENT DOCUMENTS

| | | |
|---|---|---|
| 6,496,180 B1 | 12/2002 | Hedman |
| 6,509,907 B1 * | 1/2003 | Kuwabara ................... 345/684 |
| 6,546,231 B1 * | 4/2003 | Someya et al. .......... 455/550.1 |
| 2002/0027565 A1 | 3/2002 | Syukri |

FOREIGN PATENT DOCUMENTS

| | | |
|---|---|---|
| JP | 05-061631 A | 3/1993 |
| WO | WO 01/28197 A1 | 4/2001 |
| WO | WO 01/56256 A2 | 8/2001 |
| WO | WO 02/25903 A2 | 3/2002 |

* cited by examiner

METHOD AND DEVICE FOR SCROLLING SPEED CONTROL

CROSS-REFERENCE TO RELATED APPLICATIONS

This application claims priority under 35 U.S.C. §371 from PCT International Application No. PCT/EP2004/004168, filed on Apr. 20, 2004, which claims priority from European Patent Application Ser. No. 03009504.6 filed Apr. 28, 2003, and from U.S. Provisional Application Ser. No. 60/467,963 filed May 5, 2003, the disclosures and contents of each of which are respectively incorporated by reference herein in their entireties. The above-referenced PCT International Application was published in the English language as International Publication No. WO 2004/097616.

TECHNICAL FIELD OF THE INVENTION

The present invention relates to the field of scrolling in sets of items, for instance lists provided in portable electronic devices, and more particularly to a method and a device for varying the scrolling speed for a set of items.

DESCRIPTION OF RELATED ART

The cellular phones of today have more and more different functions and applications in them. In order to sort between different functions and data relating to functions, the phones are normally provided with a menu system, in which a user can scroll in order to find data or functions that are grouped together. An example of such a group or set is for instance a telephone book, which lists a number of contacts and their corresponding phone numbers.

In the phones of today, there does not to the best of our knowledge exist the possibility to scroll lists with different speeds, they all use the same scrolling speed. This is a disadvantage, because different users might have different needs for scrolling fast, either because of personal differences or because of differences related to the items scrolled. One user might for instance need a faster scrolling speed than another user. The one and same user might also have a need for different scrolling speeds because for instance the number of items scrolled can be many, which might give rise to the need of a high scrolling speed, whereas in some other instances a slower scrolling speed might be needed because the items scrolled are few. Another reason for varying scrolling speed is that a user might be alert with quick reactions at one point in time and tired with slow reactions at another point in time, which gives rise to the need to provide different scrolling speeds also for a single user. In short there is a need to provide personalised scrolling speeds.

In the art of computers it is known to provide varied scrolling speeds automatically. Here the scrolling speed is increased automatically when a user is for instance scrolling a long text document. The user does however not have full control of this scrolling, and will in many cases feel that the scrolling goes too slowly in the beginning and too fast in the end to be able to control the scrolling properly.

There is thus a need for providing varied scrolling speeds that can be fully controlled by a user in a simple manner.

SUMMARY OF THE INVENTION

The present invention is thus directed towards providing varied scrolling speeds that can be fully controlled by a user in a simple manner.

This is achieved by detecting a scrolling action selection and a scrolling speed variation selection and changing the scrolling speed in dependence of these selections.

One object of the present invention is to provide a method enabling varied scrolling speeds that can be fully controlled by a user in a simple manner.

According to a first aspect of the present invention, this object is achieved by a method of varying the scrolling speed provided for a set of items comprising the steps of:
providing a set of items of information that can be scrolled by a user,
detecting a scrolling action selection from a user,
detecting a scrolling speed variation selection from said user, and
changing the scrolling speed in dependence of the selections made by the user.

A second aspect of the present invention is directed to a method including the features of the first aspect, wherein the step of changing is made based on simultaneous detection of scrolling action and scrolling speed variation.

A third aspect of the present invention is directed towards a method including the features of the first aspect, wherein the scrolling speed is varied with a certain step size and the scrolling speed is varied with said step size each time a scrolling speed variation selection is detected during detection of a scrolling action selection.

A fourth aspect of the present invention is directed towards a method including the features of the first aspect, wherein the scrolling speed is varied linearly when a scrolling speed variation selection is detected during detection of a scrolling action selection.

A fifth aspect of the present invention is directed towards a method including the features of the first aspect, wherein the scrolling speed variation is either an increase or a decrease of the scrolling speed.

A sixth aspect of the present invention is directed towards a method including the features of the fifth aspect, wherein a first user input unit allows actuation for a first direction and for a second opposite direction, each allowing scrolling in said direction, and a second user input unit allows actuation for the first and the second opposite directions, wherein the detection of a scrolling action selection by an actuation of the first input unit for one direction together with the detection of a scrolling speed variation selection by an actuation of the second user input unit for the same direction provides a scrolling speed increase and the detection of a scrolling action selection by an actuation of the first input unit for one direction together with the detection of a scrolling speed variation selection by an actuation of the second user input unit for the opposite direction provides a scrolling speed decrease.

A seventh aspect of the present invention is directed towards a method including the features of the first aspect, further comprising the step of saving a scrolling speed setting based on the changed scrolling speed.

An eighth aspect of the present invention is directed towards a method including the features of the seventh aspect, wherein the step of saving is performed automatically.

A ninth aspect of the present invention is directed towards a method including the features of the seventh aspect, wherein the step of saving is performed after detecting a selection of saving scrolling speed from the user.

A tenth aspect of the present invention is directed towards a method including the features of the seventh aspect, wherein the step of saving is performed for said set of items.

An eleventh aspect of the present invention is directed towards a method including the features of the tenth aspect, wherein the step of saving is also performed for at least one other set of items.

Another object of the present invention is to provide a device, which provides varied scrolling speeds that can be fully controlled by a user in a simple manner and which gives the user a feeling of full control of the scrolling.

According to a twelfth aspect of the present invention, this object is achieved by a device for varying the scrolling speed provided for a set of items comprising:

an information presentation unit providing a set of items of information that can be scrolled by a user, a first user input unit, for allowing a scrolling action selection by the user, a second user input unit for allowing a scrolling speed variation selection by the user, and a control unit arranged to:
provide said set of items of information on the information presentation unit,
detect a scrolling action selection by a user via said first user input unit,
detect a scrolling speed variation selection via said second user input unit, and
change the scrolling speed in dependence of the selections made by the user.

A thirteenth aspect of the present invention is directed towards a device including the features of the twelfth aspect, wherein the control unit is arranged to change the scrolling speed based on simultaneous detection of scrolling action and scrolling speed variation.

A fourteenth aspect of the present invention is directed towards a device including the features of the twelfth aspect, wherein the control unit is further arranged to vary the scrolling speed with a certain step size and the scrolling speed is varied with said step size each time a scrolling speed variation selection is detected during detection of a scrolling action selection.

A fifteenth aspect of the present invention is directed towards a device including the features of the twelfth, wherein the control unit is further arranged to vary the scrolling speed linearly when a scrolling speed variation selection is detected during a detection of a scrolling action selection.

A sixteenth aspect of the present invention is directed towards a device including the features of the twelfth aspect, wherein the scrolling speed variation is either an increase or a decrease of the scrolling speed.

A seventeenth aspect of the present invention is directed towards a device including the features of the sixteenth aspect, wherein the first user input unit allows actuation for a first direction and for a second opposite direction, each allowing scrolling in said direction, and the second user input unit allows actuation for the first and the second opposite direction, wherein the control unit in detecting a scrolling action selection by actuation of the first input unit for one direction together with detecting of a scrolling speed variation selection by an actuation of the second user input unit for the same direction provides a scrolling speed increase and in detecting of a scrolling action selection by detection of an actuation of the first input unit for one direction together with detecting of a scrolling speed variation selection by an actuation of the second user input unit for the opposite direction provides a scrolling speed decrease.

An eighteenth aspect of the present invention is directed towards a device including the features of the twelfth aspect, further comprising a scroll speed storage and wherein the control unit is further arranged to save a scrolling speed setting in the scroll speed storage based on the changed scrolling speed.

A nineteenth aspect of the present invention is directed towards a device including the features of the eighteenth aspect, wherein the control unit is arranged to automatically save the scrolling speed setting.

A twentieth aspect of the present invention is directed towards a device including the features of the eighteenth aspect, wherein the control unit is arranged to save the scrolling speed setting after detecting a selection of saving scrolling speed from the user.

A twenty-first aspect of the present invention is directed towards a device including the features of the eighteenth aspect, wherein the control unit is arranged to save the scrolling speed setting for said set of items.

A twenty-second aspect of the present invention is directed towards a device including the features of the eighteenth aspect, wherein the control unit is arranged to save the scrolling speed setting for at least one other set of items.

A twenty-third of the present invention is directed towards a device including the features of the twelfth aspect, wherein the first user input unit is provided as at least one navigation key for navigating in a menu system of the device and the second user input unit is provided as at least one button on the side of the device normally used for volume settings or vice versa.

A twenty-fourth aspect of the present invention is directed towards a device including the features of the twelfth aspect, wherein the first user input unit is provided as at least one button on the side of the device normally used for volume settings and the second user input unit is provided as at least one navigation key for navigating in a menu system of the device.

A twenty-fifth aspect of the present invention is directed towards a device including the features of the twelfth aspect, wherein the device is a portable electronic device.

A twenty-sixth aspect of the present invention is directed towards a device including the features of the twenty-fifth aspect, wherein the device is a portable communication device.

A twenty-seventh aspect of the present invention is directed towards a device including the features of the twenty-sixth aspect, wherein the device is a cellular phone.

The invention has the following advantages. A user can directly and in a simple manner control the scrolling speed when he is in the process of scrolling. The invention is also very inexpensive to implement, because it can be implemented using the user input units already provided in the device and the speed variation function can be provided with just some extra software in addition to the scrolling software already existing.

The embodiment according to aspects six and seventeen has the further advantage that the increasing of the scrolling speed when the actuations corresponding to the same directions coincide, and otherwise decreasing the scrolling speed also gives a user a natural and intuitive feeling that selection of change of scrolling speed matches with the scrolling direction.

The embodiment according to aspects ten and twenty-one has the further advantage that by storing the scrolling speed for a particular set of items, different scrolling speeds tailored after the different sets can be provided for a user.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
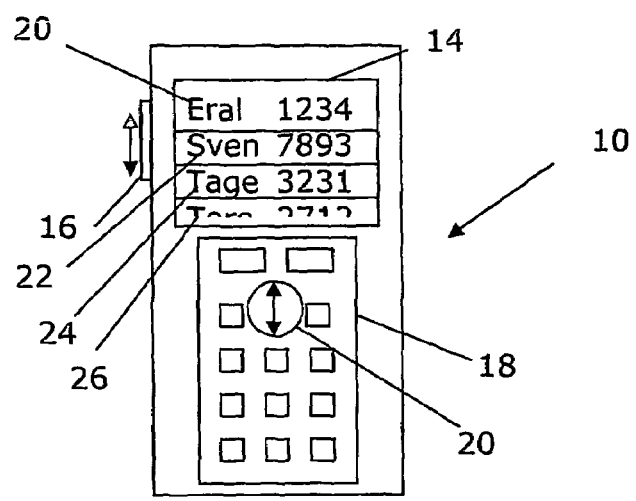
FIG. 1 shows a front view of a portable electronic device in the form of a cellular phone.

A device according to the invention, which here is a portable electronic device 10 is shown in a front view in FIG. 1. In the preferred embodiment the device is a cellular phone 10 having an information presentation unit in the form of a display 14, a first user input unit 20 in the form of a navigation key in a keypad 18. The device also has an antenna. This is however not shown because it is provided in the interior of the phone. The device also includes a second user input unit 16 in the form of a key or button 16 provided on the side of the phone. The button 16 is a so called volume button, which can be used for adjusting the volume setting of the phone, but in the present invention it has one further function, which will be described in more detail below. The volume button 16 can be actuated in an upwards direction and in an opposite downwards direction, which is indicated by an arrow pointing in both these directions in the figure. Apart from making and receiving telephone calls, the keypad 18 is used for entering information such as selection of functions and applications and responding to prompts and the display 14 is used for displaying functions and prompts to a user of the phone. In order to do this, the keypad 18 includes the navigation key 20, which can be used for navigating up and down through a menu system provided in the phone. This is also indicated by the navigation key 20 being provided with an arrow pointing both upwards and downwards. In the menu system sets of items are provided in the form of lists. In FIG. 1 one such list of items is shown. The list is here a list of contacts provided in a phone book of the phone, where the display 14 shows the name of the contact together with a phone number of the contact. In FIG. 1 the list is shown as having a first item 20, showing the name of Eral and his phone number 1234, a second item 22, showing the name of Seven and his phone number 7893, a third item 24, showing the name of Tage and his phone number 3231. Part of a fourth item 26, which cannot be fully seen, is also shown for illustrative purposes. This list can be very long and in order for a user to find a contact, which he might want to call, he might have to scroll a long time through this list. A list can typically include as much as 200 contacts. The antenna 12 is further used for communication with other users via a network.

Figure 2:
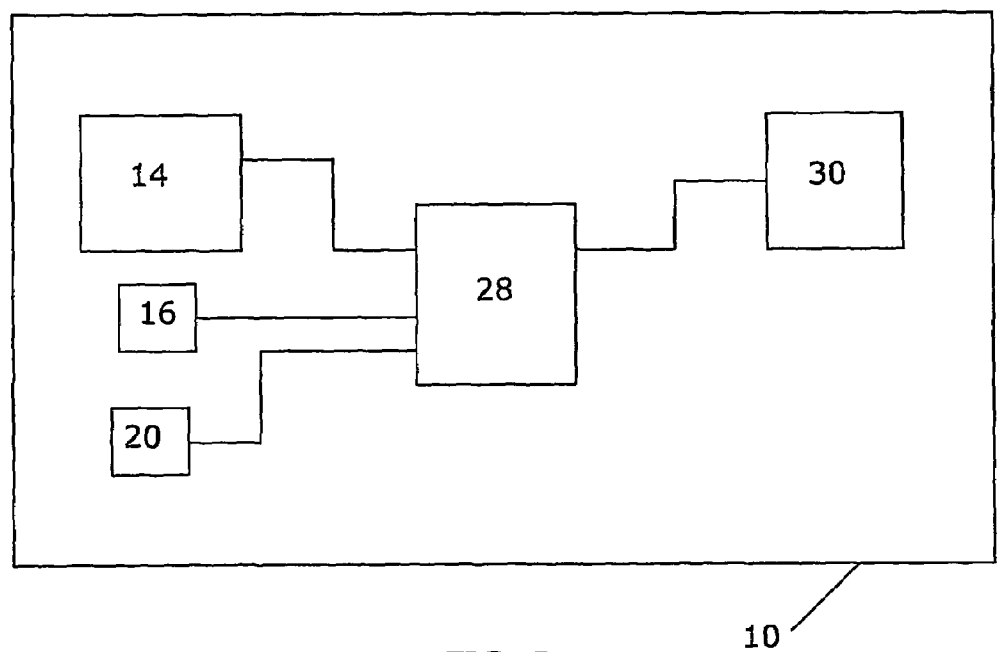
FIG. 2 shows a block schematic of the relevant parts of the invention inside the phone in FIG. 1.

FIG. 2 shows a block schematic of the different parts of the phone 10 relevant to the present invention. The display 14, the first user input unit 20 and the second user input unit 20 are here shown as separate boxes connected to a control unit 28. The control unit 28 is furthermore connected to a scroll speed storage 30.

The control unit is normally provided in the form of one or more processors with corresponding program memories containing suitable software code. The storage is also preferably provided in the form of a memory.

Figure 3:
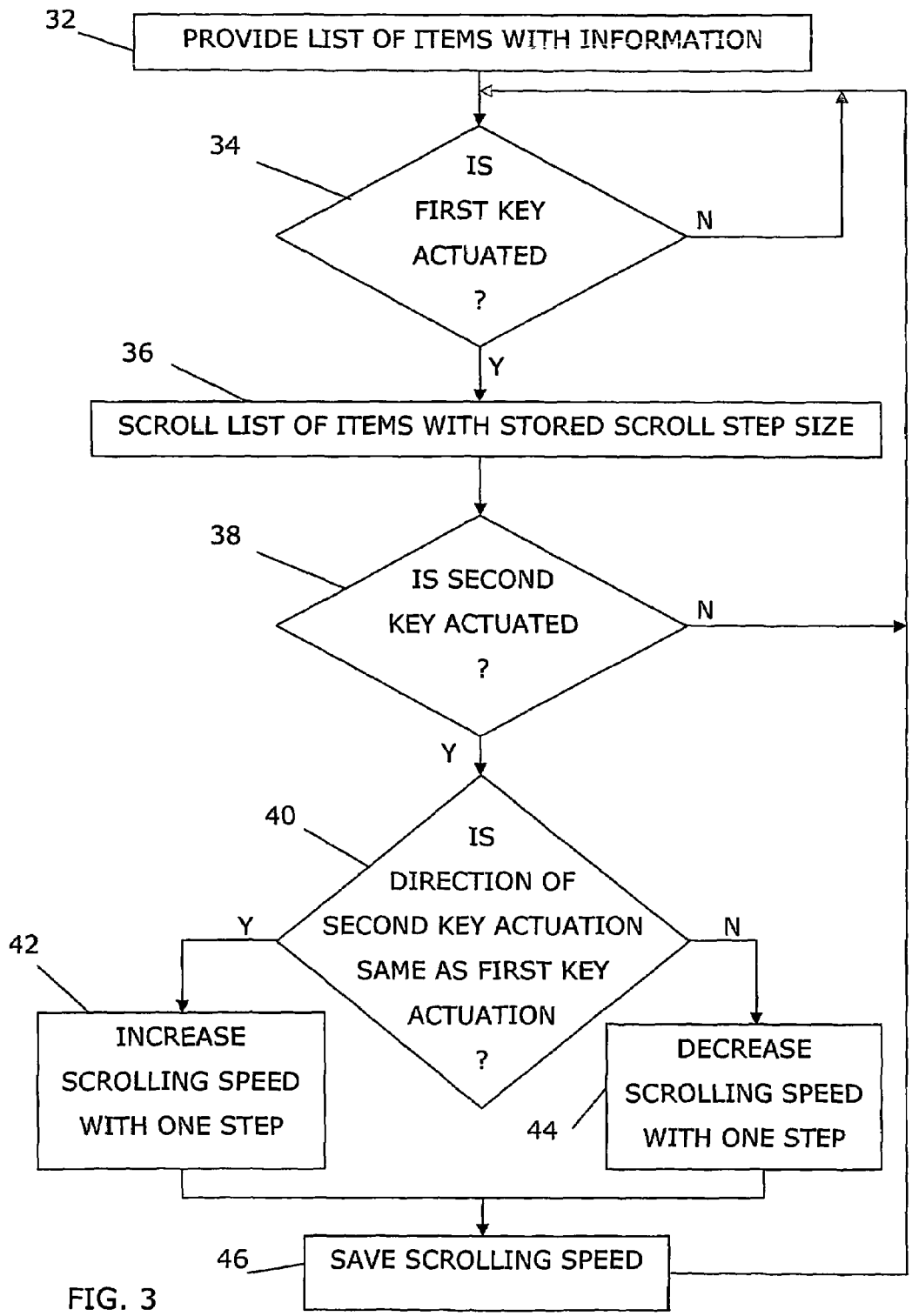
FIG. 3 shows a flow chart of a method according to the invention.

FIG. 3 shows a flow chart of the method according to the invention.

A preferred embodiment of the present invention will now be explained with reference to FIGS. 1, 2 and 3. This embodiment is also believed to be the best mode of the invention at the moment. Upon the selection of a list of items in the menu system of the phone, the control unit 28 retrieves the list of items 20, 22, 24, 26 and presents it on the display 14, step 32. The control unit 28 thereafter awaits a scrolling action selection through inputs from the user via the navigation key 20. If the key is not actuated or depressed, step 34, the control unit continues to wait. If however the navigation key is actuated, step 34, the control unit 28 goes on and scrolls the list with a stored step size, step 36. This scrolling is performed as long as the navigation key is actuated or depressed. The step size used is retrieved from scroll speed storage 30 prior to the scrolling. As long as the navigation key is depressed the control unit 28 continues to scroll the list of items. At the same time it also awaits a scrolling speed variation selection through actuation of the volume button 16 by the user. If the volume button is not actuated, step 38, the control unit goes back and monitors the navigation key, step 34. If however the second key is actuated, step 38, the control unit 28 changes the scrolling speed.

The navigation key 20 enables the possibility to navigate in an upward direction and in a downward direction as is indicated by the arrow pointing in two directions in FIG. 1. This means that if a lower part of the key is depressed, scrolling is made downwards, while if an upper part is depressed scrolling is performed in a direction upwards. The volume button also has the possibility to provide two different inputs in the same way, where the actuation in a direction upwards provides a higher volume and the actuation in a direction downwards provides a decrease of the volume. This button will according to the invention be used in a different way. When the control unit 28 thus has determined that both keys are actuated simultaneously, steps 34 and 38, it goes on and checks the direction of the scrolling selection of the first and second user input units, step 40. If both have been selected to go in the same direction, step 40, i.e. either upwards or downwards, the scrolling speed is increased with one step, step 42. However, if they have been selected to go in different directions, step 40, i.e. one in the upwards direction and the other in the downwards direction, the scrolling speed is decreased one step, step 44. This means that an actuation of the volume button in the upwards direction will only lead to an increase of the scrolling speed if the list is scrolled in the same direction. This gives a user a natural and intuitive feeling for what a scrolling speed increase or decrease would correspond to. The alternative, that one direction would always provide an increased speed would in many cases make a user feel uncomfortable when scrolling is actually performed in the opposite direction. When the scrolling speed has been increased or decreased, steps 42, 44, the new scrolling speed is automatically stored in the scroll speed storage 30 by the control unit 28, step 46, which scrolling speed is thereafter used for scrolling in this list. Thereafter the control unit 28 goes back and monitors the navigation key, step 34. This method is then continued as long as the user is present in the menu having this list and as long as he has not selected an item in the list.

The present invention has many advantages. It allows a user to get full control of the scrolling, which he would not otherwise have. One alternative less satisfactory way to provide different types of scrolling is for example to provide a scrolling setting possibility in a special settings menu. It is often not good to provide this type of solution though, because the user might feel that it is complicated to navigate to this special menu in order to set a scrolling speed. The settings would then also have to be made for every possible list of items provided, which is burdensome for a user if there are many such lists. It is preferred that the scrolling speed can be influenced directly when it is needed, i.e. when scrolling is performed. Another possible solution that has been discussed is the provision of automatic increase of the speed when the list is long. In this case the user feels he has no real control of the scrolling process. According to the present invention a user can directly and in a simple manner control the scrolling speed when he is in the process of scrolling. For a suitable selection of step size in the device, the scrolling speed can be incremented and decremented such that it suits the particular user at the particular time. By storing the scrolling speed for the particular list, different scrolling speeds tailored after the different lists can be provided for a user. The provision of increasing of the scrolling speed when the actuations corresponding to the same directions coincide, and otherwise decreasing the scrolling speed also gives a user a natural and intuitive feeling that selection of change of scrolling speed matches the scrolling direction. The invention is also very inexpensive to implement. By providing the scroll speed control with the volume button, there is furthermore no need for any additional buttons or keys on the phone and the speed variation function can be provided with just some extra software in addition to the scrolling software already existing.

The present invention can be varied in many ways. The scrolling speed was described as being varied stepwise. It should be realised that it can just as well be changed linearly. The saving of the scrolling speed might as an alternative be made after approval of the user, which approval could be made through depressing any of the keys in the keypad. The saved scrolling speed might furthermore be made to apply to more than one list, like for instance all lists. The keys described were keys, where one key can be used for indicating two directions. It is of course also possible to provide this functionality with two separate keys. The same is true for the volume button. This can also be provided as two separate buttons that either increase or decrease the volume. The navigation key was furthermore described in relation to providing navigation in only upwards and downwards directions. Naturally it is also possible to provide navigation sideways. It should also be understood that the scrolling control according to the invention could also be performed for navigation sideways. The use of the buttons described can furthermore be the opposite, in that the volume button can be used for scrolling and the navigation button be used for scrolling speed control. The invention is of course not limited to these types of buttons or keys at all, but can be used with any keys provided on a device. The set of items was described in relation to a list of contacts and their phone numbers. The invention is not limited to this, but can be provided for any set of items, such as a list of received or sent messages, a list of functions or a list of settings that can be made. It is also applicable to scrolling in for instance a text file. The invention was described in relation to a cellular phone. A cellular phone is just one example of a device in which the invention can be implemented. The invention can for instance also be used in a PDA (personal digital assistant), a palm top computer a lap top computer and a regular PC. Therefore the present invention is only to be limited by the following claims.

The invention claimed is:

1. A method of varying a scrolling speed provided for a set of items, wherein a first user input unit is configured to be actuated in a first direction and a second direction opposite the first direction, and wherein a second user input unit is configured to be actuated in the first and the second directions, the method comprising:
    providing a set of items of information that can be scrolled by a user;
    detecting a scrolling action selection from the user by actuation of the first input unit;
    detecting a scrolling speed variation selection from the user by actuation of the second user input unit; and
    changing the scrolling speed based on the detected selections by the user,
    wherein changing the scrolling speed comprises increasing the scrolling speed if the scrolling action selection and the scrolling speed variation selection correspond to a same direction, and decreasing the scrolling speed if the scrolling action selection and the scrolling speed variation selection correspond to opposite directions.

2. A method according to claim 1, wherein changing the scrolling speed comprises changing the scrolling speed based on simultaneous detection of the scrolling action selection and the scrolling speed variation selection.

3. A method according to claim 1, wherein changing the scrolling speed comprises varying the scrolling speed by a certain step size each time the scrolling speed variation selection is detected during detection of the scrolling action selection.

4. A method according to claim 1, wherein changing the scrolling speed comprises linearly varying the scrolling speed when the scrolling speed variation selection is detected during detection of the scrolling action selection.

5. A method according to claim 1, further comprising:
    saving a scrolling speed setting based on the changed scrolling speed.

6. A method according to claim 5, wherein saving the scrolling speed comprises automatically saving the scrolling speed.

7. A method according to claim 5, wherein saving the scrolling speed comprises saving the scrolling speed responsive to detecting a selection from the user.

8. A method according to claim 5, wherein saving the scrolling speed comprises saving the scrolling speed for said set of items.

9. A method according to claim 8, wherein saving the scrolling speed further comprises saving the scrolling speed for at least one other set of items.

10. A device for varying a scrolling speed provided for a set of items, comprising:
    an information presentation unit configured to provide a set of items of information that can be scrolled by a user,
    a first user input unit configured to receive a scrolling action selection by the user and configured to be actuated in a first direction and a second direction opposite the first direction,
    a second user input unit configured to receive a scrolling speed variation selection by the user and for configured to be actuated in the first and the second directions, and
    a control unit configured to:
        provide said set of items of information to the information presentation unit, detect the scrolling action selection by a user responsive to actuation of said first user input unit, detect the scrolling speed variation selection responsive to actuation of said second user input unit, and change the scrolling speed based on the detected selections by the user, wherein the control unit is configured to provide a scrolling speed increase if the scrolling action selection and the scrolling speed variation selection correspond to a same direction, and is configured to provide a scrolling speed decrease if the scrolling action selection and the scrolling speed variation selection correspond to opposite directions.

11. A device according to claim 10, wherein the control unit is configured to change the scrolling speed based on simultaneous detection of the scrolling action selection and the scrolling speed variation selection.

12. A device according to claim 10, wherein the control unit is further configured to vary the scrolling speed by a certain step size each time the scrolling speed variation selection is detected during detection of the scrolling action selection.

13. A device according to claim 10, wherein the control unit is further configured to vary the scrolling speed linearly when the scrolling speed variation selection is detected during detection of the scrolling action selection.

14. A device according to claim 10, further comprising:
a scroll speed storage unit,
wherein the control unit is further configured to save a scrolling speed setting in the scroll speed storage unit based on the changed scrolling speed.

15. A device according to claim 14, wherein the control unit is configured to automatically save the scrolling speed setting.

16. A device according to claim 14, wherein the control unit is configured to save the scrolling speed setting responsive to detecting a selection from the user.

17. A device according to any of claim 14, wherein the control unit is configured to save the scrolling speed setting for said set of items.

18. A device according to claim 17, wherein the control unit is configured to save the scrolling speed setting for at least one other set of items.

19. A device according to claim 10, wherein the first user input unit comprises at least one navigation key configured to be used for navigation of a menu system of the device, and wherein the second user input unit comprises at least one button on a side of the device configured to be used for volume settings.

20. A device according to claim 10, wherein the first user input unit comprises at least one button on a side of the device configured to be used for volume settings, and wherein the second user input unit comprises at least one navigation key configured to be used for navigation of a menu system of the device.

21. A device according to claim 10, wherein the device is a portable electronic device.

22. A device according to claim 21, wherein the device is a portable communication device.

23. A device according to claim 22, wherein the device is a cellular phone.

* * * * *

UNITED STATES PATENT AND TRADEMARK OFFICE
CERTIFICATE OF CORRECTION

PATENT NO. : 7,263,380 B2  Page 1 of 1
APPLICATION NO. : 10/553369
DATED : August 28, 2007
INVENTOR(S) : Foxenland It is certified that error appears in the above-identified patent and that said Letters Patent is hereby corrected as shown below:

On Title Page:
Please correct Item (30) to read:
   (30)   April 28, 2003   (EP)   03009504.6

In The Claims:

Column 8, Claim 10, Line 63:   Please correct "user and for configured"
                                To read -- user and configured --

Signed and Sealed this

Twenty-seventh Day of November, 2007

JON W. DUDAS
*Director of the United States Patent and Trademark Office*